United States Patent [19]

Denny et al.

[11] Patent Number: 5,853,681
[45] Date of Patent: *Dec. 29, 1998

[54] ABSORBENTS

[75] Inventors: Patrick John Denny, Darlington; Peter John Herbert Carnell, Stockton-on-Tees; Brian Peter Williams, Darlington; Cathy Anne Woodroffe, Middlesbrough; Peter Wood, Stockton-on-Tees, all of United Kingdom

[73] Assignee: Imperial Chemical Industries PLC, Millbank, England

[ * ] Notice: This patent issued on a continued prosecution application filed under 37 CFR 1.53(d), and is subject to the twenty year patent term provisions of 35 U.S.C. 154(a)(2).

[21] Appl. No.: 704,639

[22] PCT Filed: Mar. 2, 1995

[86] PCT No.: PCT/GB95/00448

§ 371 Date: Sep. 4, 1996

§ 102(e) Date: Sep. 4, 1996

[87] PCT Pub. No.: WO95/24962

PCT Pub. Date: Sep. 21, 1995

[30] Foreign Application Priority Data

Mar. 17, 1994 [GB] United Kingdom ............ 9405269

[51] Int. Cl.$^6$ .................................................. C01B 17/16
[52] U.S. Cl. .................... 423/225; 423/230; 423/232; 423/244.01; 423/245.1; 502/345; 502/346; 502/415; 208/246
[58] Field of Search .................. 208/246; 502/345, 502/346, 415; 423/25, 225, 230, 232, 244.01, 245.1

[56] References Cited

U.S. PATENT DOCUMENTS

| 4,582,819 | 4/1986 | Miller et al. | 502/415 |
| 4,983,367 | 1/1991 | Denny et al. | 423/224 |

*Primary Examiner*—David W. Wu

[57] ABSTRACT

Absorbents, suitable for absorbing sulphur compounds such as hydrogen sulphide from gases and liquids, in the form of shaped units having an average size within the range 1–10 mm and containing at least 75% by weight of an absorbent material comprising copper carbonate, basic copper carbonate, and/or copper hydroxide. The units preferably have a bulk density of at least 0.9 kg/l, especially at least 1.2 kg/l. The units are preferably agglomerates containing a small amount of a binder such as a cement and may also contain a proportion of alumina to catalyse hydrolysis of carbon-containing sulphur compounds such as carbonyl sulphide or carbon disulphide.

12 Claims, No Drawings

ABSORBENTS

This invention relates to absorbents and in particular to compositions containing copper compounds for the absorption of sulphur compounds, such as hydrogen sulphide, which are often present as impurities in gases and liquids such as hydrocarbon streams, e.g. natural gas.

There have been numerous proposals of using composition containing copper compounds for the absorption of such sulphur compounds: in many of the previous proposals the copper is present in the composition as an oxide, often together with other components such as zinc oxide and/or alumina. Often the copper oxide is reduced to the corresponding metal before use, or is used for treating gas streams containing a reducing gas such as carbon monoxide or hydrogen at such an elevated temperature that reduction of the oxide will occur in situ.

In our EP-A-0 243 052 we demonstrate that certain compositions, containing certain copper compounds, in the form of agglomerates, e.g. granules, as opposed to moulded tablets or pellets, have superior sulphur absorption characteristics and can be used without a reduction step and have good absorption characteristics at low temperatures. The agglomerates were formed by mixing the composition containing the copper compounds with a cement binder and with a little water, insufficient to form a slurry, and then causing the composition to agglomerate into roughly spherical granules. Alternatively the granules could be made by extruding the wetted composition. In that reference, the composition contained zinc or aluminium compounds, preferably both, in addition to the copper compounds and the cement binder. Preferably zinc atoms formed 10–40% of the total number of copper, zinc, and aluminium atoms. Specifically we described the production of agglomerates using a copper-compound containing composition produced by mixing co-precipitated copper and zinc basic carbonates, ie a zinc-substituted malachite, with a zinc aluminate precipitate. We described that such agglomerates, which had been dried but which had not been calcined at a temperature high enough to decompose the basic carbonates, were useful for absorbing hydrogen sulphide at low temperatures, and were superior to agglomerates that had been calcined.

U.S. Pat. No. 4,582,819 discloses the use of agglomerates formed by extruding a mixture of alumina and basic copper carbonate, e.g. malachite, followed by calcination, for the absorption of sulphur compounds. Under the calcination conditions disclosed, viz heating to above 500° F. (260° C.), the malachite will decompose to copper oxide. The agglomerates of this reference contain substantial amounts (above 25% by weight) of alumina.

The amount of sulphur that can be absorbed from a gas stream depends on the absorption capacity of the absorbent, the amount of absorbent employed, and the absorption profile given by a bed of the absorbent. The absorption capacity of an absorbent is the theoretical amount of sulphur that can be absorbed by a given weight of an absorbent.

Thus 1 kg of an absorbent composed of copper oxide or zinc oxide and containing 10% by weight of non-absorbent material, eg alumina, has a theoretical capacity to absorb about 350–360 g of sulphur; on the other hand 1 kg of an absorbent of malachite, or zinc-substituted malachite, again containing 10% by weight of non-absorbent material, has a theoretical sulphur absorption capacity of only about 250–260 g.

It is generally not possible for the full theoretical capacity of the absorbent bed to be realised: thus some sulphur compounds will be detected in the product stream leaving the bed before the theoretical capacity has been realised. The reason for this is that the sulphur absorption front in the bed is not sharp: the sharper the absorption front, the closer the theoretical capacity can be approached.

We have found that despite their lower theoretical capacity compared to copper oxide or copper metal, absorbents made from copper carbonate, basic copper carbonate, or copper hydroxide in fact can give a greater actual sulphur capacity.

Accordingly the present invention provides shaped absorbent units having an average size within the range 1–10 mm and containing at least 75% by weight of an absorbent material selected from copper carbonate, basic copper carbonate, and copper hydroxide and mixtures thereof.

The weight of absorbent that can be employed depends on the volume of the vessel containing the absorbent bed and the bulk density of the absorbent. It is desirable to maximise the weight of sulphur that can be absorbed by a bed of absorbent, i.e. by a given volume of absorbed. Hence it is desirable to maximise the bulk density of the absorbent, provided the other absorption characteristics are not unduly adversely affected. [The bulk density of particles is the density of a bed of the particles and is determined by filling a vessel of known volume with the particles, with tapping of the vessel to ensure settling of the particles, and then determining the weight of particles in the vessel. The bulk density is of course considerably lower than the density of the particles themselves since a considerable proportion of the volume of a bed of the particles is taken up by the spaces between adjacent particles. As an example, a bed of pellets made as described in Example 3 hereafter had a density of 1.07 kg/l, whereas the density of the individual pellets, i.e. the particle density, was about 1.85 kg/l.]

We have found that it is possible to produce absorbents comprising copper carbonates, basic carbonates, or hydroxides, having a bulk density of at least 0.9 kg/l, particularly at least 1.2 kg/l.

The shaped units may be in the form of tablets formed by moulding a suitable powder composition, generally containing a material such as graphite or magnesium stearate as a moulding aid, in suitably sized moulds, e.g. as in conventional tableting operation. Alternatively, the shaped units may be in the form of extruded pellets formed by forcing a suitable composition, containing the absorbent material and often a binder and a little water and/or a moulding aid as indicated above, through a die followed by cutting the material emerging from the die into short lengths. For example extruded pellets may be made using a pellet mill of the type used for pelleting animal feedstuffs, wherein the mixture to be pelleted is charged to a rotating perforate cylinder through the perforations of which the mixture is forced by a bar or roller within the cylinder: the resulting extruded mixture is cut from the surface of the rotating cylinder by a doctor knife positioned to give extruded pellets of the desired length. Alternatively, and preferably, the shaped units may be in the form of agglomerates formed by mixing the absorbent material with a cement binder and with a little water, insufficient to form a slurry, and then causing the composition to agglomerate into roughly spherical, but generally irregular, granules. The different shaping methods have an effect on the surface area, porosity and pore structure within the shaped articles and in turn this often has a significant effect on the absorption characteristics and on the bulk density.

Thus beds of absorbents in the form of moulded tablets may exhibit a relatively broad absorption front, whereas beds of agglomerates can have a much sharper absorption front: this enables a closer approach to be made to the theoretical absorption capacity. On the other hand, agglomerates generally have lower bulk densities than tabletted compositions: however, as described hereinafter, agglomerates with an adequately high bulk density can be produced and so it is preferred to make the shaped units in the form of agglomerates. Preferably the shaped units have a BET surface area of at least 10 m²/g.

In the shaped units of the invention, the absorbent material comprises copper carbonate, basic copper carbonate, and/or copper hydroxide. Basic copper carbonate, especially malachite, is the preferred absorbent material, and the shaped units are preferably agglomerates.

As indicated above, the agglomerates are normally made by mixing the absorbent material with a binder and a little water and then forming the composition into granules. The binder is preferably a cement such as a calcium aluminate cement. Since the binder represents non-absorbent material, its proportion is preferably kept to a minimum consistent with obtaining agglomerates of strength sufficient to withstand handling and the loads encountered during normal use. The amount of cement is typically 5–10% by weight of the agglomerates. Similar amounts of cement may be used when the shaped articles are in the form of extruded pellets.

In the aforesaid EP-A-0 243 052 it was preferred that the agglomerates contain zinc compounds, eg basic zinc carbonate. We have found that, at low absorption temperatures, eg below about 100° C., copper compounds are superior absorbents for hydrogen sulphide compared to zinc compounds. Accordingly it is preferred that the shaped absorbent units of the present invention contain less than 10% by weight of zinc compounds, and preferably essentially no zinc compounds, although it will be appreciated that such compounds may inevitably be present as impurities in the other components.

For most applications, the shaped units, e.g. agglomerates, may comprise simply an absorbent material selected from copper carbonate, basic carbonate and/or hydroxide, and a binder. Where the absorbent is to be used for hydrogen sulphide absorption, preferably at least 90% by weight of the shaped unit is such an absorbent material. However, as described below, where the absorbent is to be used for removal of hydrolysable sulphur compounds such as carbonyl sulphide, the shaped units preferably also contain a high surface area gamma alumina to catalyse the hydrolysis of the carbonyl sulphide: in this case, preferably the shaped units contain 9 to 20% by weight of such alumina and so the content of copper carbonate, basic carbonate, or hydroxide is typically in the range 75 to 85% by weight.

The absorbent material, eg basic copper carbonate, may be naturally occurring mineral that has been ground to a suitable size powder, or may be a synthetic product obtained by precipitation. Where it is required that alumina (in addition to any present in the cement binder) is included, the alumina may be added as a powder to the absorbent material powder or may be introduced by precipitation. Thus it may be co-precipitated with the absorbent material, or the latter may be precipitated into a slurry of precipitated alumina, or the alumina may be precipitated into a slurry of the absorbent material. Alternatively slurries of separate precipitates may be mixed. After such precipitation, the precipitates are filtered off, and dried. However the drying conditions should be such that the copper carbonate or basic carbonate is not decomposed to any significant extent. Thus the drying should be effected at a temperature no higher than about 150° C., and preferably at a temperature no higher than 115° C.

Where the shaped units are agglomerates or extruded pellets, in order that the shaped units may be made with a high bulk density, it is desirable that the absorbent material powder used to make the shaped units has a particle size, and particle size distribution, such that the $D_{50}$ particle size is between about 4 μm and 12 μm, the $D_{90}$ particle size about 1.4 to 2.5 times the value of $D_{50}$, and the $D_{10}$ particle size about 0.15 to 0.5 times the value of $D_{50}$. [By the terms $D_{10}$, $D_{50}$, and $D_{90}$ particle sizes, we mean the sizes at which 10%, 50%, and 90% by volume, respectively, of the particles have a size smaller than the quoted value]. With powders of particle size, or particle size distributions, outside these ranges it may prove to be difficult to achieve high bulk density agglomerates.

The absorbent units of the invention are of particular use for removing hydrogen sulphide from gas or liquid streams at low temperatures. The temperature at which they are employed should be less than about 150° C., at which significant decomposition of the copper carbonate or basic carbonate may start to occur. Preferably the absorption is effected at below 100° C., particularly where the absorbent material comprises copper hydroxide. The temperature is most preferably in the range −10° C. to 80° C. The absorption process may be effected at any suitable pressure; typical pressures range from atmospheric up to about 200 bar abs.

Where the gas or liquid being treated contains carbonyl sulphide and/or carbon disulphide as well as, or instead of, hydrogen sulphide, then it is desirable to employ absorbents containing a proportion of alumina, in addition to any alumina present in the binder. The alumina should be a high surface area gamma alumina, preferably having a BET surface area of at least 150 m²/g. The alumina assists the reaction of the carbonyl sulphide or carbon disulphide. It is not normally necessary to add any water to the fluid to effect such hydrolysis: thus some hydroxyl groups will normally be associated with the alumina and water is evolved upon absorption of the hydrogen sulphide produced by the hydrolysis, e.g.

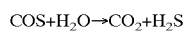

$COS + H_2O \rightarrow CO_2 + H_2S$

$Cu(OH)_2 \cdot CuCO_3 + 2H_2S \rightarrow 2CuS + CO_2 + 3H_2O$ and so will be available for further hydrolysis.

Indeed, with conventional zinc or iron absorbents, it has been found that the addition of water to the gas stream is desirable in order to maximise the amount of sulphur that a given volume of absorbent can absorb. Addition of water to hydrocarbon gas streams however is desirably avoided because of the risk of formation of hydrocarbon hydrates which, at high operating pressures, may separate out and cause blockages in pipelines. In contrast, we have found that there is no need to add water where the absorbent is a copper compound as specified above.

The fluid being treated may be a hydrocarbon stream, e.g. natural gas, substitute natural gas, natural gas liquids, naphtha, reforming gases, for example hydrocarbon streams such as propylene separated from the product of cracking naphtha; synthesis gas produced, for example, by the partial oxidation of a carbonaceous feedstock; organic compounds such as alcohols, esters, or chlorinated hydrocarbons; or other gases such as carbon dioxide, hydrogen, nitrogen, or helium.

In order to maximise the absorption capability of a bed of absorbent, it is preferable to operate the desulphurisation process using two beds in series. By this means it is possible that the first bed can become fully saturated with sulphur compounds before unacceptable sulphur compound break-through occurs into the effluent from the second bed. When the first bed is fully saturated, it is replaced with fresh absorbent and the order in which the fluid being treated passes through the beds is reversed. Thus the partially saturated bed that was the second bed gas is now used as the first bed through which the fluid passes and the fresh bed becomes the bed through which the fluid passes after passage through the partially saturated bed.

The invention is illustrated by the following examples in which samples of basic copper carbonate (malachite) powders of differing particle sizes and particle size distribution as follows were employed:

| Powder | $D_{10}$ (μm) | $D_{50}$ (μm) | $D_{90}$ (μm) | $D_{90}/D_{50}$ | $D_{10}/D_{50}$ | bulk density of powder (kg/l) |
|---|---|---|---|---|---|---|
| A | 1.5 | 7.6 | 14.4 | 1.9 | 0.2 | 1.34 |
| B | 1.7 | 8.0 | 15.1 | 1.9 | 0.2 | 1.36 |
| C | 3.0 | 7.6 | 12.6 | 1.7 | 0.4 | 1.46 |
| D | 1.9 | 4.4 | 8.7 | 2.0 | 0.4 | 0.63 |
| E | 1.1 | 4.2 | 7.1 | 1.7 | 0.3 | 1.30 |

The bulk density (BD) was assessed by charging the material under test to a 100 ml measuring cylinder until the measuring cylinder, after tapping the side thereof to permit settling of the material, was filled to the 60 ml mark. The weight of the material in the cylinder was then determined.

EXAMPLE 1

Shaped units in the form of agglomerates were made by mixing 93 parts by weight of the appropriate basic copper carbonate powder with 7 parts by weight of calcium aluminate cement powder and a little water, insufficient to give a slurry, and the mixture formed into roughly spherical agglomerates the bulk of which had approximate diameters within the range 3–5 mm using a laboratory granulator. Agglomerates of size within this range were separated from the remainder of the composition by sieving and then dried at 110° C. for 4 hours. The dried agglomerates made from powders A, B, and C had bulk densities in the range 1.33 to 1.37 kg/l, but the agglomerates made from powder D had a bulk density of only 0.85 kg/l, indicating that it was desirable to employ a high bulk density powder in order to obtain high bulk density agglomerates. Samples of other basic copper carbonate powders of high bulk density but of larger particle size ($D_{10}$ 16.9 and 25.1 μm, $D_{50}$ 26.8 and 41.7 μm, and $D_{90}$ 44.8 and 74.3 μm respectively) gave only low yields of agglomerates of the desired size.

The absorption characteristics of the dried agglomerates made from powders A, 8, and C respectively were determined by passing natural gas containing 1% by volume of hydrogen sulphide at atmospheric pressure and 20° C. down through a vertical cylindrical bed of the appropriate agglomerates of height 12 cm and height to diameter ratio 5 at a space velocity of about 700 h$^{-1}$. The time taken before hydrogen sulphide could be detected (at the 1 ppm level) in the exit gas was determined and is quoted in the following table as the "break-through" (B-T) time. Samples were then taken from different heights of the bed (Portion 1 is the first 2 cm depth of the bed from the top, Portion 2 is the portion 2–4 cm from the top etc. so that Portion 6 is the bottom portion of the bed, i.e. the portion 10–12 cm from the top) and analysed for the sulphur content. The results are shown in the following table.

| | Agglomerates | Break-through | Sulphur content (% by weight) | | | | | | |
|---|---|---|---|---|---|---|---|---|---|
| | | | Bed portion | | | | | | |
| Powder | BD (kg/l) | time (hrs) | 1 | 2 | 3 | 4 | 5 | 6 | Average |
| A | 1.37 | 20 | 28 | 30 | 29 | 28 | 15 | 2 | 22 |
| B | 1.35 | 16 | 17 | 29 | 28 | 25 | 12 | 2 | 19 |
| C | 1.33 | 15 | 8 | 25 | 29 | 26 | 13 | 3 | 17 |

The theoretical sulphur absorption capacity of the agglomerates was about 360–370 g/l. At the theoretical absorption capacity, each portion of the bed would have a sulphur content of about 31% by weight: the actual sulphur capacity (calculated from the average sulphur content) of the beds ranged from about 210 g/l (for agglomerates made from powder C) to about 270 g/l (for agglomerates made from powder A).

It is seen from the above data that the sulphur content of at least portions 2 to 4 of the bed was close to the theoretical maximum. Therefore if two absorbent beds corresponding respectively to portions 1–3 and 4–6 were utilised in series, the first bed, i.e. corresponding to portions 1–3, would become fully saturated, i.e. have an average sulphur content of about 29% by weight (in the case of the agglomerates made from powder A) which is close to the theoretical maximum, before an unacceptable amount of sulphur was detected in the effluent from the second bed, corresponding to portions 4–6. At this stage the second bed (in the case of the agglomerates made from powder A) has an average sulphur content of about 15% by weight and so if then used as the first in a series of beds has the ability of absorbing about the same amount of sulphur again before it needs replenishing.

EXAMPLE 2 (COMPARATIVE)

By way of comparison agglomerates were made in accordance with the teaching of EP-A0 243 052 by mixing 93 parts by weight of an uncalcined co-precipitated zinc-substituted malachite/alumina powder (wherein the copper, zinc and aluminium were in the atomic proportions Cu 55: Zn 27: Al 18) with 7 parts by weight of calcium aluminate cement powder and granulating the mixture as described above. The $D_{10}$, $D_{50}$, and $D_{90}$ particle sizes of the co-precipitated zinc-substituted malachite/alumina powder were 3.4, 7.7 and 17.5 μm respectively. The dried agglomerates had a bulk density of 0.95 kg/l and a theoretical sulphur absorption capacity of about 230 g/l.

The results of sulphur absorption testing of a bed of the agglomerates by the method described in Example 1 were as follows:

| | | Sulphur content (% by weight) | | | | | | |
|---|---|---|---|---|---|---|---|---|
| Agglomerate bulk density (kg/l) | Break-through time (hrs) | Bed portion | | | | | | |
| | | 1 | 2 | 3 | 4 | 5 | 6 | Average |
| 0.95 | 12 | 20.3 | 22.0 | 21.9 | 18.9 | 8.1 | 1.8 | 15.5 |

EXAMPLE 3 (COMPARATIVE)

Following the procedure of Example 1 of U.S. Pat. No. 4,521,387, 2000 g of copper nitrate trihydrate, 3132 g of zinc nitrate hexahydrate, and 414 g of aluminium nitrate nonahydrate were dissolved in water and the solution diluted to 10 l. Another solution was made by dissolving 2180 g of sodium carbonate in water and diluted to 10.28 l.

The two solutions were fed separately to a continuous, stirred, precipitation apparatus maintained at 80° C. while controlling the rates of feed so that the pH was maintained at 7–7.5. The resulting precipitate was stirred for 45 min at 75° C. and then the precipitate was filtered off and washed. The precipitate was then dried in an oven at 115° C. for 12 hours and then calcined at 270° C. to a constant loss on ignition (at 900° C.) of 10% by weight.

Analysis of the resultant powder showed the following composition (by weight):

CuO 42.7%
ZnO 53.3%
$Al_2O_3$ 3.8%

A portion of the calcined precipitate was then mixed with 2% by weight of graphite and the mixture moulded into cylindrical tablets of 5.4 mm diameter and 3.6 mm height using a laboratory tableting machine. The crushing strength of the resultant cylindrical tablets was assessed by applying an increasing load between the flat faces of the cylinder until the pellets broke: the average load required to crush the tablets was 123 kg which corresponds to a crushing strength of 537 kg/cm$^2$. The tablets had a bulk density of 1.07 kg/l, while the density of the individual tablets, i.e the particle density was 1.85 kg/l.

Another portion of the calcined precipitate was mixed with 6.5% by weight of calcium aluminate cement and a little water and the mixture formed into spherical agglomerates of diameters ranging from 3.35 to 4.85 mm using a laboratory granulator. The agglomerates were then dried at 115° C. for 4 hours. The load required to crush the agglomerates was 0.4 kg. The bulk density of the agglomerates was 0.54 kg/l.

Testing beds of the tablets and agglomerates for hydrogen sulphide absorption by the method described in Example 1 gave:

| | | | Sulphur content (% by weight) | | | | | | |
|---|---|---|---|---|---|---|---|---|---|
| Sample | bulk density (kg/l) | Break-through time (min) | Bed portion | | | | | | |
| | | | 1 | 2 | 3 | 4 | 5 | 6 | Avg |
| tablets | 1.07 | 195 | 6.9 | 5.7 | 4.4 | 2.4 | 1.2 | 0.3 | 3.5 |
| agglomerates | 0.54 | 180 | 7.0 | 7.2 | 7.6 | 7.3 | 7.5 | 2.2 | 6.5 |

The calculated theoretical and actual sulphur absorption capacities were 371 and 34 g/l respectively for the tablets and 175 and 33 g/l respectively for the agglomerates.

EXAMPLE 4

The procedure of Example 1 was repeated using 90 parts by weight of basic copper carbonate powder E and 10 parts by weight of the calcium aluminate cement, and using a larger scale granulator which imposed more shear on the mixture during granulation. The resultant agglomerates had a bulk density of 1.6 kg/l, and gave the following results when tested for hydrogen sulphide absorption as in Example 1. In this example the sulphur capacity of the bed portions is quoted (g/l) rather than the sulphur content (% by weight) of the bed portions.

| | agglomerates | Sulphur content (g/l) | | | | | | |
|---|---|---|---|---|---|---|---|---|
| Powder | BD (kg/l) | Bed portion | | | | | | |
| | | 1 | 2 | 3 | 4 | 5 | 6 | Avg |
| E | 1.6 | 346 | 346 | 332 | 258 | 114 | 12 | 235 |

The theoretical absorption capacity of the bed was about 410–420 g/l.

EXAMPLE 5

Shaped units in the form of agglomerates were made by the procedure of Example 1 using 100 parts by weight of the powder E, 10 parts by weight of gamma alumina of BET surface area (SA) 185 m$^2$/g, and 7 parts by weight of a calcium aluminate cement. The resultant agglomerates had a BET surface area (SA) of 27.4 m$^2$/g and contained about 85.5% by weight of malachite. A bed of the agglomerates had a bulk density (BD) of 1.33 kg/l. The agglomerates were tested for hydrogen sulphide absorption as in Example 1. The break-through (B-T) time was 17.4 hours and the average sulphur content of the bed was 170 g/l. It is seen by comparison with Example 1 that the incorporation of the alumina decreased the sulphur absorption capacity of the bed.

The absorption test was then repeated using a fresh sample of the agglomerates and using carbonyl sulphide in place of hydrogen sulphide. The break-through time (B-T) taken before carbonyl sulphide could be detected (at the 10 ppm level) in the exit gas was 16.4 hours and the average sulphur content of the discharged bed was 124 g/l.

EXAMPLES 6–11

Agglomerates were made as described in Example 5 with different amounts of gamma alumina and using aluminas of different types. The absorption of carbonyl sulphide was tested as described in Example 5. The results, together with those of Example 5, are as shown in the following table.

|  | Alumina | | agglomerates | | COS removal | |
| --- | --- | --- | --- | --- | --- | --- |
| Ex | SA (parts) | malachite (m²/g) | SA (wt %) | BD (m²/g) | B-T time (kg/l) | sulphur capacity (g/l) (hrs) |
| 5 | 10 | 185 | 85.5 | 27.4 | 1.33 | 16.4 | 124 |
| 6 | 20 | 185 | 78.7 | 45.0 | 1.31 | 20.0 | 163 |
| 7 | 5 | 185 | 89.3 | 15.9 | 1.35 | 3.2 | 25 |
| 8 | 10 | 65 | 85.5 | 14.6 | 1.31 | 0.8 | 5 |
| 9 | 10 | 4 | 85.5 | 12.8 | 1.33 | 0.5 | 3 |
| 10 | 10 | 258 | 85.5 | 18.3 | 1.31 | 9.8 | 83 |
| 11 | 10 | 128 | 85.5 | 23.4 | 1.28 | 3.1 | 24 |

The alumina used in examples 5–7 was gamma alumina. The aluminas used in examples 8–11 were as follows:
  Example 8 gamma alumina calcined at 900° C. so as to reduce its surface area
  Example 9 alumina trihydrate
  Example 10 alumina trihydrate calcined at 350° C.
  Example 11 alumina trihydrate calcined at 700° C.

Results similar to those of Example 8 were obtained with gamma alumina calcined at 1100° C. and 1250° C. to give alumina of surface areas 32 and 8 m²/g respectively. These examples indicate that it is desirable to employ a high surface area gamma alumina if carbonyl sulphide is to be effectively removed. Example 7 demonstrates that the use of a small amount of alumina, viz 4.5% by weight of the agglomerates, does not enable carbonyl sulphide to be satisfactorily removed.

EXAMPLES 12–14

Cylindrical tablets of 5.4 mm diameter and 3.6 mm height were moulded using a laboratory tableting machine formed from 100 parts by weight of malachite powder E, 2 parts by weight of graphite as a lubricant, and, in examples 13 and 14, also 7 and 11 part by weight of calcium aluminate cement respectively. The resultant tablets were then tested for their hydrogen sulphide absorption properties as in Example 1. The results were as follows.

|  | tablets | | | Hydrogen sulphide removal | |
| --- | --- | --- | --- | --- | --- |
| Ex | malachite (wt %) | SA (m²/g) | BD (kg/l) | B-T time (hrs) | sulphur capacity (g/l) |
| 12 | 95.0 | 8.0 | 1.64 | 16.4 | 167 |
| 13 | 91.7 | 5.7 | 1.62 | 12.3 | 114 |
| 14 | 55.5 | 7.0 | 1.64 | 13.2 | 127 |

By comparison with Examples 1 and 4 it is seen that despite the high bulk density, the sulphur capacity is significantly inferior to that of agglomerates, probably as a result of the low surface area of the tables.

EXAMPLE 15

Shaped articles in the form of extrudates of diameter about 2 mm and length 5–10 mm were made from a mixture of 90 parts of malachite powder E, 7 parts by weight of a clay extrusion aid and 7 parts by weight of calcium aluminate cement by mixing with a little water to form a paste which was then extrudes through a suitable die using a single screw extruder. The extrudates were dried at about 110° C. The resultant extrudates were then tested for their hydrogen sulphide absorption properties as in Example 1. The results were as follows.

|  | extrudates | | | Hydrogen sulphide removal | | |
| --- | --- | --- | --- | --- | --- | --- |
| Ex | malachite (wt %) | SA (m²/g) | BD (kg/l) | B-T time (hrs) | avg sulphur content (% wt) | sulphur capacity (g/l) |
| 15 | 84.1 | 20.3 | 0.95 | 13.3 | 14.8 | 121 |

It is seen that the sulphur capacity is relatively low, as a result of the relatively low bulk density.

We claim:

1. Shaped absorbent units having an average size within the range 1–10 mm and containing at least 75% by weight of an uncalcined absorbent material selected from the group consisting of copper carbonate, basic copper carbonate, copper hydroxide and mixtures thereof, said units having a bulk density of at least 1.2 kg/l and a BET surface area of at least 10 m²/g.

2. Shaped absorbent units according to claim 1 containing at least 80% by weight of copper carbonate or basic copper carbonate.

3. Shaped absorbent units according to claim 1 in the form of agglomerates containing 5–10% by weight of a cement binder.

4. Shaped absorbent units according to claim 1 wherein the uncalcined absorbent material is basic copper carbonate.

5. Shaped absorbent units according to claim 1 containing 9 to 20% by weight of gamma alumina having a surface area of at least 150 m²/g.

6. A process for the absorption of hydrogen sulphide from a gas or liquid comprising passing said gas or liquid at a temperature below 150° C. through a bed of shaped absorbent units having an average size within the range 1–10 mm and containing at least 75% by weight of an uncalcined absorbent material selected from the group consisting of copper carbonate, basic copper carbonate, copper hydroxide and mixtures thereof, said units having a bulk density of at least 1.2 kg/l and a BET surface area of at least 10m²/g.

7. A process according to claim 6 wherein said gas or liquid is passed through the bed at a temperature in the range −10° C. to 80° C.

8. A process for the absorption of carbonyl sulphide or carbon disulphide from a gas or liquid comprising passing said gas or liquid at a temperature below 150° C. through a bed of shaped absorbent units having an average size within the range 1–10 mm and containing at least 75% by weight of an uncalcined absorbent material selected from the group consisting of copper carbonate, basic copper carbonate, copper hydroxide and mixtures thereof, and 9 to 20% by weight of gamma alumina having a surface area of at least 150 $m^2/g$, said units having a bulk density of at least 1.2 kg/l and a BET surface area of at least 10 $m^2/g$.

9. A process according to claim 8 wherein said gas or liquid is passed through the bed at a temperature in the range of −10° C. to 80° C.

10. Shaped absorbent units having an average size within the range 1–10 mm and containing at least 75% by weight of an uncalcined absorbent material selected from the group consisting of copper carbonate, basic copper carbonate, copper hydroxide and mixtures thereof, said units having a sulphur absorption capacity of at least 170 g/l as determined by measuring the sulphur content of a vertical cylindrical bed of the units of height 12 cm and height to diameter ratio 5 after passing natural gas containing 1% by volume of hydrogen sulphide at atmospheric pressure and 20° C. down through the bed at a space velocity of 700 $h^{-1}$ until 1 ppm of hydrogen sulphide could be detected in the gas leaving the bed.

11. Shaped absorbent units according to claim 10 having a BET surface area of at least 10 $m^2/g$.

12. Shaped absorbent units according to claim 10 having a sulphur absorption capacity of at least 210 g/l.

* * * * *